(12) United States Patent
Zhang et al.

(10) Patent No.: US 10,140,917 B2
(45) Date of Patent: Nov. 27, 2018

(54) POWER SUPPLY CIRCUIT, DRIVING METHOD FOR THE SAME AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Chenggeng Zhang, Beijing (CN); Boya Zhang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 106 days.

(21) Appl. No.: 15/220,991

(22) Filed: Jul. 27, 2016

(65) Prior Publication Data
US 2017/0243534 A1 Aug. 24, 2017

(30) Foreign Application Priority Data
Feb. 19, 2016 (CN) .......................... 2016 1 0094306

(51) Int. Cl.
*G09G 1/00* (2006.01)
*G09G 3/3225* (2016.01)

(52) U.S. Cl.
CPC ... *G09G 3/3225* (2013.01); *G09G 2310/0289* (2013.01); *G09G 2330/02* (2013.01)

(58) Field of Classification Search
CPC ................................ G09G 2330/00–2330/028
See application file for complete search history.

(56) References Cited

U.S. PATENT DOCUMENTS

2012/0223647 A1* 9/2012 Brokaw ............... G09G 3/3696
315/160

FOREIGN PATENT DOCUMENTS

CN 101378229 A 3/2009
CN 101527989 A 9/2009
(Continued)

OTHER PUBLICATIONS

First Chinese Office Action dated Feb. 24, 2017; Appln. No. 201610094306.7.

*Primary Examiner* — Sanghyuk Park
(74) *Attorney, Agent, or Firm* — Ladas & Parry LLP; Loren K. Thompson

(57) ABSTRACT

Provided are a power supply circuit, a driving method for the same, and a display device. The power supply circuit comprises a first control sub-circuit, a second control sub-circuit, a voltage converting sub-circuit, a first output sub-circuit, and a second output sub-circuit; the first control sub-circuit controls the first voltage level terminal to be connected to the first node, the second control sub-circuit controls the second voltage level terminal to be connected to the second node, the voltage converting sub-circuit adjusts the voltage at the first node and the voltage at the second node, the first output sub-circuit outputs the voltage at the first node to the first output terminal, the second output sub-circuit outputs the voltage at the second node to the second output terminal. Structure of the power supply circuit can be simplified, and thereby manufacturing cost of the power supply circuit can be reduced.

20 Claims, 3 Drawing Sheets

(56) References Cited

FOREIGN PATENT DOCUMENTS

| | | | |
|---|---|---|---|
| CN | 101919307 | A | 12/2010 |
| CN | 102186293 | A | 9/2011 |
| CN | 104240765 | A | 12/2014 |
| CN | 104703338 | A | 6/2015 |

* cited by examiner in a first stage, the first control sub-circuit connects the first voltage level terminal to the first node under control of the voltage at the first scan signal terminal, the second control sub-circuit connects the second voltage level terminal to the second node under control of the voltage of the second scan signal terminal, and the voltage converting sub-circuit stores electrical energy inputted through the first node — S31 in a second stage, the first control sub-circuit connects the first voltage level terminal to the first node under control of the voltage at the first scan signal terminal, the second control sub-circuit disconnects the second voltage level terminal from the second node under control of the voltage of the second scan signal terminal, the voltage converting sub-circuit adjusts the voltage at the second node through the stored electrical energy, and the second output sub-circuit outputs the voltage at the second node to the second output terminal under control of the voltage of the fourth scan signal terminal — S32 in a third stage, the first control sub-circuit connects the first voltage level terminal to the first node under control of the voltage at the first scan signal terminal, the second control sub-circuit connects the second voltage level terminal to the second node under control of the voltage of the second scan signal terminal, and the voltage converting sub-circuit stores electrical energy inputted through the first node — S33 in a fourth stage, the first control sub-circuit disconnects the first voltage level terminal from the first node under control of the voltage at the first scan signal terminal, the second control sub-circuit connects the second voltage level terminal to the second node under control of the voltage of the second scan signal terminal, the voltage converting sub-circuit adjusts the voltage at the first node through the stored electrical energy, the first output sub-circuit outputs the voltage at the first node to the first output terminal under control of the voltage of the third scan signal terminal — S34

FIG. 3

POWER SUPPLY CIRCUIT, DRIVING METHOD FOR THE SAME AND DISPLAY DEVICE

TECHNICAL FIELD

The present disclosure relates to a power supply circuit, a driving method for the same and a display device.

BACKGROUND

Along with unceasing development of display technology, application of OLED display devices using AMOLED (Active matrix organic light emitting diode) display technology becomes more and more widespread.

The OLED display device can operate normally only when multiple different voltages are provided concurrently, thus it needs multiple types of power supply chips to convert a battery voltage or an AC (alternating current) voltage to which the display device is connected into voltages required by the OLED display device. For example, an analog reference voltage required by a driving chip of the OLED display device, a digital voltage and an analog reference voltage required by an input/output interface, an analog voltage and a digital voltage required by a processor signal system, an anode voltage and a cathode voltage required by an OLED pixel driving circuit. Among them, the anode voltage and the cathode voltage required by the OLED pixel driving circuit provide energy for light emitting to an EL (Electro Luminescent) component in the AMOLED display device, respectively, and power required thereby is also the most. Circuit structure of the OLED power supply circuit in the solutions of the prior art is relatively complex and cost thereof is relatively high.

SUMMARY

At least one embodiment of the present disclosure provides a power supply circuit, a driving method for the same and a display device, which are capable of simplifying structure of the power supply circuit and further reducing manufacturing cost of the power supply circuit.

According to a first aspect of the present disclosure, there is provided a power supply circuit, comprising a first control sub-circuit, a second control sub-circuit, a voltage converting sub-circuit, a first output sub-circuit, and a second output sub-circuit:

the first control sub-circuit is connected to a first voltage level terminal, a first scan signal terminal, and a first node, and configured to control the first voltage level terminal to be connected to the first node under control of a voltage at the first scan signal terminal;

the second control sub-circuit is connected to a second voltage level terminal, a second scan signal terminal, and a second node, and configured to control the second voltage level terminal to be connected to the second node under control of a voltage at the second scan signal terminal;

the voltage converting sub-circuit is connected to the first node and the second node, and configured to adjust a voltage at the first node and a voltage at the second node under control of the first control sub-circuit and the second control sub-circuit;

the first output sub-circuit is connected to a third scan signal terminal, a first output terminal and the first node, and configured to output the voltage at the first node to the first output terminal under control of a voltage at the third scan signal terminal; and the second output sub-circuit is connected to a fourth scan signal terminal, a second output terminal, and the second node, and configured to output the voltage at the second node to the second output terminal under control of a voltage at the fourth scan signal terminal.

Optionally, the first control sub-circuit comprises a first transistor;

a first terminal of the first transistor is connected to the first voltage level terminal, a second terminal thereof is connected to the first node, and a gate thereof is connected to the first scan signal terminal.

Optionally, the second control sub-circuit comprises a second transistor;

a first terminal of the second transistor is connected to the second voltage level terminal, a second terminal thereof is connected to the second node, and a gate thereof is connected to the second scan signal terminal.

Optionally, the first output sub-circuit comprises a third transistor and a first diode;

a first terminal of the third transistor is connected to the first node, a second terminal thereof is connected to a cathode of the first diode, and a gate thereof is connected to the third scan signal terminal; and an anode of the first diode is connected to the first output terminal.

Optionally, the second output sub-circuit comprises a fourth transistor and a second diode;

a first terminal of the fourth transistor is connected to the second node, a second terminal thereof is connected to an anode of the second diode, and a gate thereof is connected to the fourth scan signal terminal; and a cathode of the second diode is connected to the second output terminal.

Optionally, the voltage converting sub-circuit comprises an inductor;

a first terminal of the inductor is connected to the first node and a second terminal thereof is connected to the second node.

Optionally, each of the transistors is an N-type transistor.

Optionally, each of the transistors is a P-type transistor.

According to a second aspect of the present disclosure, there is provided a driving method for the power supply circuit described above, comprising:

in a first stage, the first control sub-circuit connecting the first voltage level terminal to the first node under control of the voltage at the first scan signal terminal, the second control sub-circuit connecting the second voltage level terminal to the second node under control of the voltage of the second scan signal terminal, and the voltage converting sub-circuit storing electrical energy inputted through the first node;

in a second stage, the first control sub-circuit connecting the first voltage level terminal to the first node under control of the voltage at the first scan signal terminal, the second control sub-circuit disconnecting the second voltage level terminal from the second node under control of the voltage of the second scan signal terminal, the voltage converting sub-circuit adjusting the voltage at the second node through the stored electrical energy, and the second output sub-circuit outputting the voltage at the second node to the second output terminal under control of the voltage of the fourth scan signal terminal;

in a third stage, the first control sub-circuit connecting the first voltage level terminal to the first node under control of the voltage at the first scan signal terminal, the second control sub-circuit connecting the second voltage level terminal to the second node under control of the voltage of the second scan signal terminal, and the voltage converting sub-circuit storing electrical energy inputted through the first node;

in a fourth stage, the first control sub-circuit disconnecting the first voltage level terminal from the first node under control of the voltage at the first scan signal terminal, the second control sub-circuit connecting the second voltage level terminal to the second node under control of the voltage of the second scan signal terminal, the voltage converting sub-circuit adjusting the voltage at the first node through the stored electrical energy, and the first output sub-circuit outputting the voltage at the first node to the first output terminal under control of the voltage of the third scan signal terminal.

According to a third aspect of the present disclosure, there is provided a display device, comprising an OLED display panel and the power supply circuit described above;

the first output terminal and the second output terminal of the power supply circuit being connected respectively to a pixel driving circuit of the OLED display panel.

The power supply circuit provided by the at least one embodiment of the present disclosure comprises the first control sub-circuit, the second control sub-circuit, the voltage converting sub-circuit, the first output sub-circuit, and the second output sub-circuit, wherein the first control sub-circuit can control the first voltage level terminal be connected to the first node, the second control sub-circuit can control the second voltage level terminal be connected to the second node, the voltage converting sub-circuit can adjust the voltage at the first node and the voltage at the second node, the first output sub-circuit can output the voltage at the first node to the first output terminal, the second output sub-circuit can output the voltage at the second node to the second output terminal, i.e., the power supply circuit provided by the at least one embodiment of the present disclosure converts an input voltage into two different voltages through one voltage converting sub-circuit, a boosting circuit and a buck circuit are integrated together and only a single voltage converting sub-circuit is required, so that structure of the power supply circuit can be simplified, and thereby manufacturing cost of the power supply circuit can be reduced.

BRIEF DESCRIPTION OF THE DRAWINGS

A brief introduction of drawings used in the embodiments will be provided below.

FIG. 3 is a flowchart of steps of a driving method for a power supply circuit provided by an embodiment of present disclosure;

DETAILED DESCRIPTION OF THE EMBODIMENTS

Figure 1:
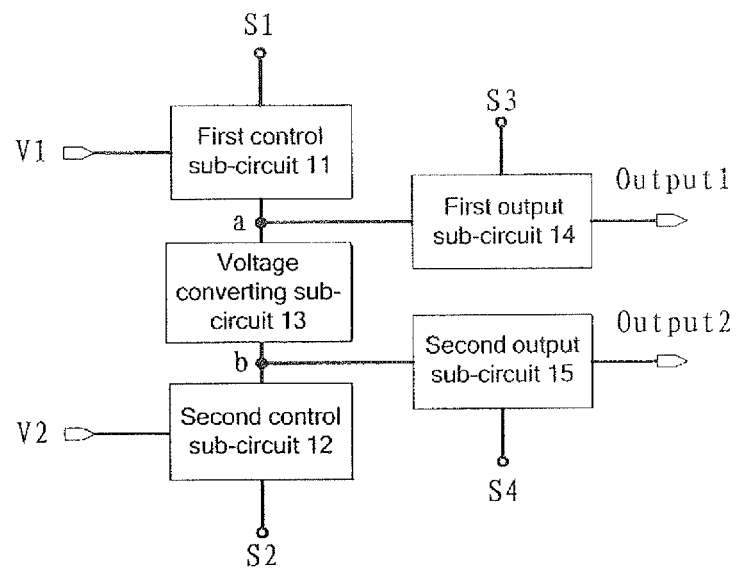
FIG. 1 is a schematic diagram of a structure of a power supply circuit provided by an embodiment of present disclosure.

Hereinafter, the technical solutions in the embodiments of the present disclosure will be described clearly and comprehensively in combination with the drawings of the embodiments. Obviously, these described embodiments are merely parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

Transistors adopted in all of the embodiments of the present disclosure may each be a thin film transistor, or an FET (Field Effect Transistor), or other devices of the same properties. Based on a function achieved in the circuit, transistors adopted in the embodiments of the present disclosure mainly are switch transistors. Since the source and the drain of switch transistors adopted here are symmetrical, thus the source and the drain of these transistors are interchangeable. In the embodiments of the present disclosure, in order to differentiate the two electrodes of the transistors other than the gate, the source thereof is referred to as a first terminal, the drain thereof is referred to as a second terminal. According to states in the drawings, it is prescribed that an intermediate terminal of the transistors is a gate, a terminal for inputting a signal is a source, and a terminal for outputting a signal is a drain. In addition, transistors adopted in the embodiments of the present disclosure comprise two types of transistors, namely P-type transistors and N-type transistors, wherein the P-type switch transistor is turned on when a gate thereof is at a low voltage level and turned off when a gate thereof is at a high voltage level, and the N-type switch transistor is turned on when a gate thereof is at a high voltage level and turned off when a gate thereof is at a low voltage level.

It should be noted that the words such as "first", "second" and so on in the present disclosure are merely intended to differentiate the same or similar items whose functions and roles are substantially the same, rather than to make definitions to a number and an order of execution.

FIG. 1 is a schematic diagram of a structure of a power supply circuit provided by an embodiment of present disclosure. Referring to FIG. 1, the power supply circuit comprises: a first control sub-circuit 11, a second control sub-circuit 12, a voltage converting sub-circuit 13, a first output sub-circuit 14, and a second output sub-circuit 15.

The first control sub-circuit 11 is connected to a first voltage level terminal V1, a first scan signal terminal S1, and a first node a, and configured to control the first voltage level terminal V1 to be connected to the first node a under control of a voltage at the first scan signal terminal S1.

The second control sub-circuit 12 is connected to a second voltage level terminal V2, a second scan signal terminal S2, and a second node b, and configured to control the second voltage level terminal V2 to be connected to the second node b under control of a voltage at the second scan signal terminal S2.

The voltage converting sub-circuit 13 is connected to the first node a and the second node b, and configured to adjust a voltage at the first node a and a voltage at the second node b under control of the first control sub-circuit 11 and the second control sub-circuit 12.

The first output sub-circuit 14 is connected to a third scan signal terminal S3, a first output terminal Output1, and the first node a, and configured to output the voltage at the first node a to the first output terminal Output1, under control of a voltage at the third scan signal terminal S3.

The second output sub-circuit 15 is connected to a fourth scan signal terminal S4, a second output terminal Output2, and the second node b, and configured to output the voltage at the second node b to the second output terminal Output2, under control of a voltage at the fourth scan signal terminal S4.

The power supply circuit provided by the embodiment of the present disclosure comprises the first control sub-circuit, the second control sub-circuit, the voltage converting sub-circuit, the first output sub-circuit, and the second output sub-circuit, wherein the first control sub-circuit can control the first voltage level terminal to be connected to the first node, the second control sub-circuit can control the second voltage level terminal to be connected to the second node, the voltage converting sub-circuit can adjust the voltage at the first node and the voltage at the second node, the first output sub-circuit can output the voltage at the first node to the first output terminal, the second output sub-circuit can output the voltage at the second node to the second output terminal, i.e., the power supply circuit provided by the embodiment of the present disclosure converts an input voltage into two different voltages through one voltage converting sub-circuit, in comparison to generating an OLED anode voltage and an OLED cathode voltage respectively by one boost circuit and one buck circuit in the solutions of the prior art, in the power supply circuit provided by the embodiment of the present disclosure, the boost circuit and the buck circuit are integrated together and only a single voltage converting sub-circuit is required, i.e., the OLED anode voltage and the OLED cathode voltage are generated by a single power supply circuit, so that in the embodiment of the present disclosure, structure of the power supply circuit can be simplified, and thereby manufacturing cost of the power supply circuit can be reduced.

Figure 2:
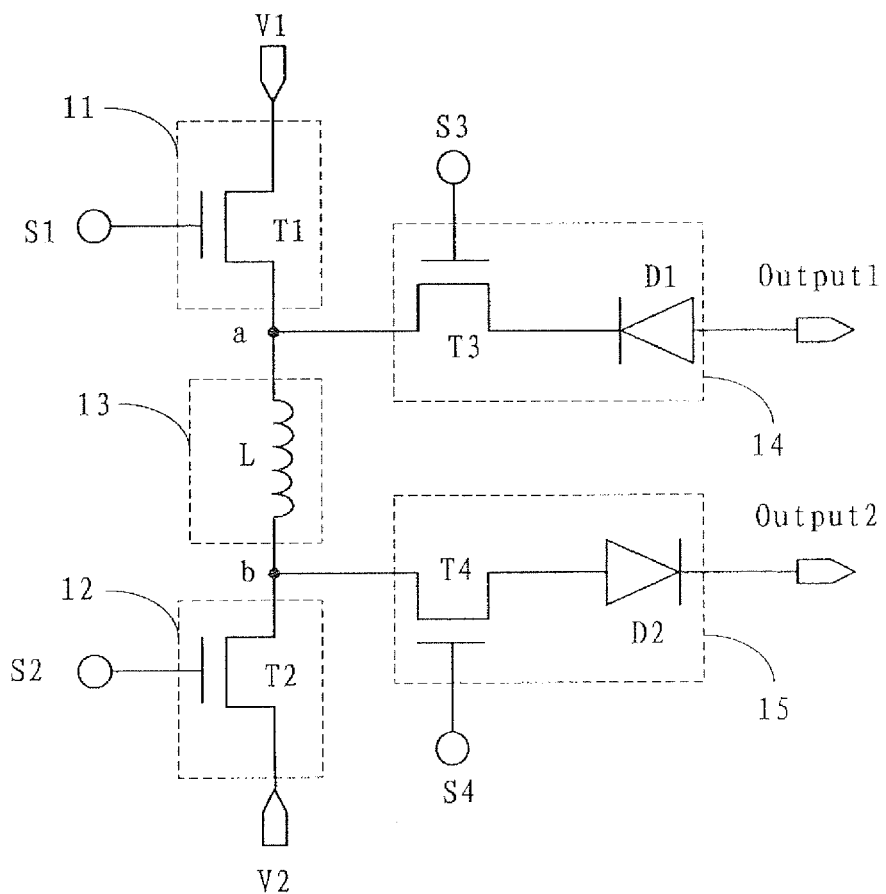
FIG. 2 is a circuit diagram of a power supply circuit provided by an embodiment of present disclosure.

FIG. 2 is a circuit diagram of a power supply circuit provided by an embodiment of present disclosure. Referring to FIG. 2, the first control sub-circuit 11 comprises a first transistor T1.

A first terminal of the first transistor T1 is connected to the first voltage level terminal V1, a second terminal thereof is connected to the first node a, and a gate thereof is connected to the first scan signal terminal S1.

The second control sub-circuit 12 comprises a second transistor T2.

A first terminal of the second transistor T2 is connected to the second voltage level terminal V2, a second terminal thereof is connected to the second node b, and a gate thereof is connected to the second scan signal terminal S2.

The voltage converting sub-circuit 13 comprises an inductor L.

A first terminal of the inductor L is connected to the first node a, and a second terminal thereof is connected to the second node b.

The first output sub-circuit 14 comprises a third transistor T3 and a first diode D1.

A first terminal of the third transistor T3 is connected to the first node a, a second terminal thereof is connected to a cathode of the first diode D1, and a gate thereof is connected to the third scan signal terminal S3.

An anode of the first diode D1 is connected to the first output terminal Output1.

The second output sub-circuit 15 comprises a fourth transistor T4 and a second diode D2.

A first terminal of the fourth transistor T4 is connected to the second node b, a second terminal thereof is connected to an anode of the second diode D2, and a gate thereof is connected to the fourth scan signal terminal S4.

A cathode of the second diode D2 is connected to the second output terminal Output2.

Another embodiment of the present disclosure provides a driving method for the power supply circuit described above. FIG. 3 is a flowchart of steps of a driving method for a power supply circuit provided by an embodiment of present disclosure. Referring to FIG. 3, the driving method for the power supply circuit comprises the following steps.

S31: in a first stage, the first control sub-circuit connects the first voltage level terminal to the first node under control of the voltage at the first scan signal terminal, the second control sub-circuit connects the second voltage level terminal to the second node under control of the voltage of the second scan signal terminal, and the voltage converting sub-circuit stores electrical energy inputted through the first node.

S32: in a second stage, the first control sub-circuit connects the first voltage level terminal to the first node under control of the voltage at the first scan signal terminal, the second control sub-circuit disconnects the second voltage level terminal from the second node under control of the voltage of the second scan signal terminal, the voltage converting sub-circuit adjusts the voltage at the second node through the stored electrical energy, and the second output sub-circuit outputs the voltage at the second node to the second output terminal under control of the voltage at the fourth scan signal terminal.

S33: in a third stage, the first control sub-circuit connects the first voltage level terminal to the first node under control of the voltage at the first scan signal terminal, the second control sub-circuit connects the second voltage level terminal to the second node under control of the voltage of the second scan signal terminal, and the voltage converting sub-circuit stores electrical energy inputted through the first node.

S34: in a fourth stage, the first control sub-circuit disconnects the first voltage level terminal from the first node under control of the voltage at the first scan signal terminal, the second control sub-circuit connects the second voltage level terminal to the second node under control of the voltage of the second scan signal terminal, the voltage converting sub-circuit adjusts the voltage at the first node through the stored electrical energy, and the first output sub-circuit outputs the voltage at the first node to the first output terminal under control of the voltage at the third scan signal terminal.

The power supply circuit provided by the embodiment of the present disclosure comprises the first control sub-circuit, the second control sub-circuit, the voltage converting sub-circuit, the first output sub-circuit, and the second output sub-circuit, wherein the first control sub-circuit can control the first voltage level terminal to be connected to the first node, the second control sub-circuit can control the second voltage level terminal to be connected to the second node, the voltage converting sub-circuit can adjust the voltage at the first node and the voltage at the second node, the first output sub-circuit can output the voltage at the first node to the first output terminal, the second output sub-circuit can output the voltage at the second node to the second output terminal, i.e., the power supply circuit provided by the embodiment of the present disclosure converts an input voltage into two different voltages through one voltage converting sub-circuit, a boost circuit and a buck circuit are integrated together and only a single voltage converting sub-circuit is required, so that in the embodiment of the present disclosure, structure of the power supply circuit can be simplified, and thereby manufacturing cost of the power supply circuit can be reduced.

Figure 4:
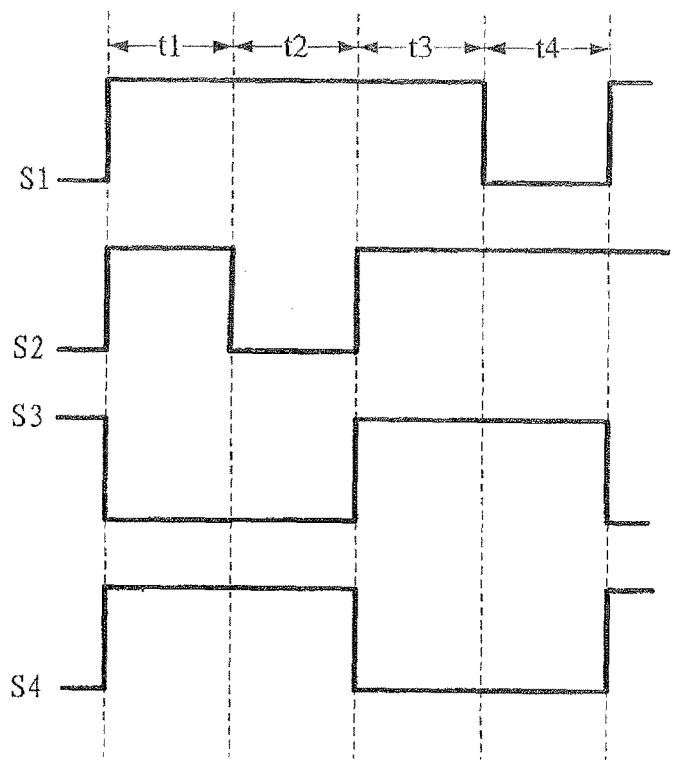
FIG. 4 is a time sequence state diagram of respective scan signals in a power supply circuit provided by an embodiment of present disclosure.

FIG. 4 is a time sequencetime sequence state diagram of respective scan signals in a power supply circuit provided by an embodiment of present disclosure. Exemplarily, next, referring to the schematic diagram of the time sequence state shown in FIG. 4, operating principles of the power supply circuit shown in FIG. 2 and the driving method for the power supply circuit shown in FIG. 3 will be explained with all the transistors in the embodiment of the present disclosure being N-type transistors as example. FIG. 4 shows the time sequence states of a first scan signal at the first scan signal terminal S1, a second scan signal at the second scan signal terminal S2, a third scan signal at the third scan signal terminal S3, and a fourth scan signal at the fourth scan signal terminal S4. In addition, the first voltage level terminal V1 and the second voltage level terminal V2 both provide a stable DCvoltage, a first voltage at the first voltage level terminal V1 is a high voltage with respect to a second voltage at the second voltage level terminal V2. Exemplarily, the second voltage level terminal V2 may be grounded. As shown in FIG. 4, time sequence states in the four stages are provided, wherein the first stage includes t1; the second stage includes t2; the third stage includes t3; and the fourth stage includes t4.

In the stage t1, a scan signal with a high voltage level is inputted from S1, S2, and S4 respectively, a scan signal with a low voltage level is inputted from S3, T1 is turned on because S1 is connected to the gate of T1, T2 is turned on because S2 is connected to the gate of T2, T3 is tuned off because S3 is connected to the gate of T3, T4 is turned on because S4 is connected to the gate of T4. The first node a is connected to the first voltage level terminal V1 via T1, the second node b is connected to the second voltage level terminal V2 via T2, current in the power supply circuit flows from the first voltage level terminal V1, through the first transistor T1, the inductor L, and the second transistor T2, towards the second voltage level terminal V2; the inductor L converts electrical energy in the circuit into magnetic energy and stores the magnetic energy. In addition, because the anode of the second diode D2 is connected to the second voltage level terminal V2, the second diode D2 is in a reversely-biased, turned-off state, and can achieve the function of separation, thus in this stage, the second output terminal Output2 has no output.

In the stage t2, a scan signal with a high voltage level is inputted from S1 and S4 respectively, a scan signal with a low voltage level is inputted from S2 and S3 respectively, T1 is turned on because S1 is connected to the gate of T1, T4 is turned on because S4 is connected to the gate of T4, T2 is turned off because S2 is connected to the gate of T2, T3 is turned off because S3 is connected to the gate of T3. Since in this stage, the second transistor T2 is switched to the turned-off state from the turned-on state in the stage t1, current in the circuit cannot pass through T2 anymore, and the inductor L converts the magnetic energy stored in the stage t1 into electrical energy, to thereby obstruct a change of the current in the circuit, in this case, the voltage at the second node b is a superposition of the first voltage at the first voltage level terminal V1 and a voltage generated by the inductor L, so in this stage, the voltage at the second node increases. And because T2 is turned off and T4 is turned on in this stage, the second output terminal Output2 can output the voltage at the second node b, meanwhile, because of a filtering function of the second diode D2, the second output terminal Output2 can output a stable voltage.

The above stages t1 and t2 are a process of converting an input voltage into a higher voltage, thus stage t1 and stage t2 together are referred to as a boost stage.

In stage t3, a scan signal with a high voltage level is inputted from S1, S2, and S3 respectively, a scan signal with a low voltage level is inputted from S4, T1 is turned on because S1 is connected to the gate of T1, T2 is turned on because S2 is connected to the gate of T2, T3 is turned on because S3 is connected to the gate of T3, T4 is turned off because S4 is connected to the gate of T4. The first node a is connected to first voltage level terminal V1 via T1, the second node b is connected to the second voltage level terminal V2 via T2, current in the circuit flows from the first voltage level terminal V1, through the first transistor T1, the inductor L, and the second transistor T2, towards the second voltage level terminal V2; the inductor L converts electrical energy in the circuit into magnetic energy and stores the magnetic energy. In addition, the cathode of the first diode D1 is connected to the first voltage level terminal V1, so the first diode D1 is in a reversely-biased, turned-off state, and can achieve the function of separation, thus in this stage, the first output terminal Output1 has no output.

In stage t4, a scan signal with a high voltage level is inputted from S2 and S3 respectively, a scan signal with a low voltage level is inputted from S1 and S4 respectively, T1 is turned off because S1 is connected to the gate of T1, T2 is turned on because S2 is connected to the gate of T2, T3 is turned on because S3 is connected to the gate of T3, T4 is turned off because S4 is connected to the gate of T4. Since in this stage, the first transistor T1 switches into the turned-off state from the turned-on state in the stage t3, current in the circuit cannot pass through T1 anymore, and the inductor L converts the magnetic energy stored in the stage t3 into electrical energy to obstruct a change of the current in the circuit, in this case, the voltage at the first node a is a negative voltage, thus in this stage, the voltage at the first node reduces, the first diode D1 is turned on. And because T1 is turned off and T3 is turned on in this stage, the first output terminal Output1 can output the voltage at the first node a, meanwhile, because of a filtering function of the first diode a1, the first output terminal Output1 can output a stable voltage.

The above stage t3 and stage t4 are a process of converting an input voltage into a lower voltage, thus stage t3 and stage t4 together are referred to as a buck stage.

Further, each of respective transistors in the above embodiment may also be a P-type transistor that is turned on at a low voltage level, if each of the respective transistors is a P-type transistor, then it only needs to re-adjust time sequence states of respective scan signals of the power supply circuit, for example, in stage t1, S1, S2, and S4 input a low voltage level respectively, S3 inputs a high voltage level, respective scan signals in the other stages are also adjusted to timing signals having opposite phases.

Still further, the above power supply circuit may adopt both the N-type transistor and the P-type transistor concurrently, in this case, it needs to ensure that transistors that are controlled by the same timing signal or the same voltage in the power supply circuit adopt the same type, which of course is a proper modified solution that can be made by those skilled in the art according to the embodiments of the present disclosure, thus falls into the protection scope of the present disclosure. However, in consideration of manufacturing process of the transistors, active layers of different types of transistors use different doping material, thus adopting transistors whose types are the same in the power supply circuit can better facilitate manufacturing process of the power supply circuit.

Further, when designing the power supply circuit provided in the above embodiments, an inductance value L of the inductor L that is applicable will be described below:

An amount of change of the current per unit time in the inductor L is:

$$\Delta I = \frac{V_L}{L} \cdot \Delta t;$$

where $\Delta I$ is an amount of change of the current in the inductor L within a time period $\Delta t$, $V_L$ is a voltage on the inductor L; L is an inductance value of the inductor L.

Since the first voltage level terminal V1 provides the stable first voltage $V_1$, and the voltage at the second voltage level terminal V2 always is zero, thus when the first transistor T1 and the second transistor T2 both are turned on, the voltage on the inductor L is $V_L=V_1$; the current in the inductor L increases linearly, its current increasing amount is:

$$\Delta I_{L1} = \frac{V_1 \cdot T \cdot D}{L};$$

where T is a cycle, i.e., a sum of the above t1, t2, t3, and t4, D is duty ratio, i.e., $$D = \frac{t1}{T}.$$

When the second transistor T2 switches into the turned-off state from the turned-on state, the current in the inductor L decreases linearly, its current reducing amount is:

$$\Delta I_{L2} = \frac{(V_O - V_1) T \cdot (1-D)}{L};$$

where $V_O$ is an output voltage of the second output terminal; and according to that the current increasing amount $\Delta I_{L1}$ in the inductor and the current reducing amount $\Delta I_{L2}$ in the inductor are equal in a stable state, it can be derived that:

$$\frac{V_1 \cdot T \cdot D}{L} = \frac{(V_O - V_1) T \cdot (1-D)}{L};$$

After simplification, it can be derived that a current gain is:

$$\frac{V_O}{V_1} = \frac{1}{1-D};$$

the duty ratio is calculated as:

$$D = \frac{V_O - V_1}{V_O}.$$

Then according to the energy conservation law, the electrical energy inputted into the inductor L equals to the electrical energy outputted from the inductor L, it can be derived that:

$V_1 \cdot I_L = V_O \cdot I_O$; where $I_L$ is an average current in the inductor L; $I_O$ is an output current of the inductor L.

Substituting into the above formula for the current gain, it can be derived:

$$I_L = \frac{I_O}{1-D};$$

an average current value of the inductor is $$I_L = \frac{1}{2} \cdot \frac{V_1 \cdot D \cdot T}{L} \text{ then } I_L = \frac{1}{2} \cdot \frac{V_1 \cdot D \cdot T}{L} = \frac{I_O}{1-D};$$

Because the inductance value of the inductor in the embodiments of the present disclosure needs to be capable of effectuating a peak current during voltage conversion, the inductance value of the inductor is calculated as:

$$L = \frac{\eta}{L_{IR}} \times \frac{1}{focs} \times \frac{V_1^2 \cdot (V_O - V_1)}{V_O^2 \cdot I_L};$$

where $\eta$ is a valid conversion rate, f cos is a valid voltage output frequency, $L_{IR}$ is a ratio of the current change amount $\Delta I$ to the output value $I_O$.

Similarly, when the first transistor T1 switches from the turned-on state into the turned-off state, the output voltage of the inductor L is:

$$V_O = -\frac{D}{1-D} \cdot V_1$$

its duty ratio is:

$$D = \frac{t3}{T}.$$

Figure 5:
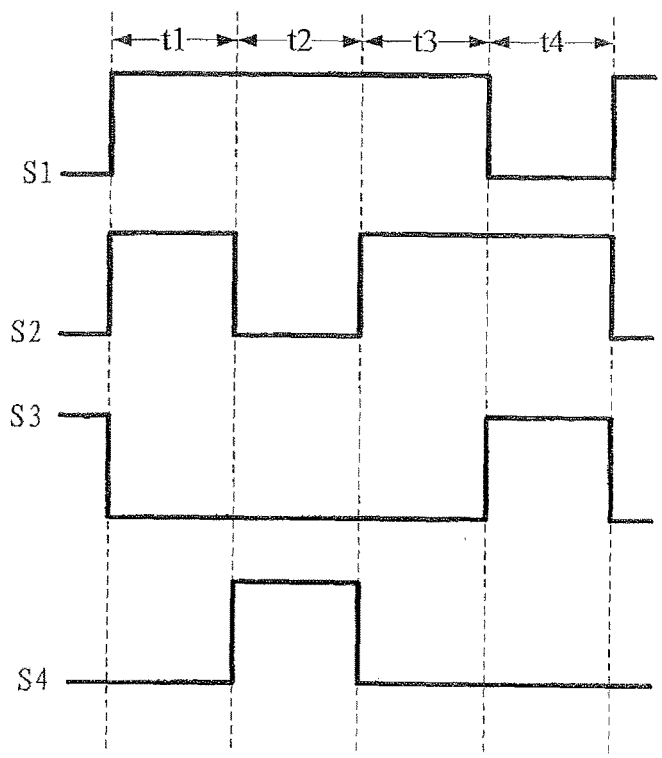
FIG. 5 is another time sequence state diagram of respective scan signals in a power supply circuit provided by an embodiment of present disclosure.

FIG. 5 is another time sequence state diagram of respective scan signals in a power supply circuit provided by an embodiment of present disclosure. FIG. 5 shows the time sequence states of a first scan signal at the first scan signal terminal S1, a second scan signal at the second scan signal terminal S2, a third scan signal at the third scan signal terminal S3, and a fourth scan signal a the fourth scan signal terminal S4, the principles of driving the power supply circuit in FIG. 5 is similar to the principles of the time sequence states shown in FIG. 4, the difference lies in that, the fourth scan signal at the fourth scan signal terminal S4 is at a low voltage level in the first stage t1, and the third scan signal at the third scan signal terminal S3 is at a low voltage level in the third stage t3. According to the above operating principles, it can be known that: the first stage t1 and the third stage t3 both are stages of charging the inductor L, in said stages, the first output terminal Output1 and the second output terminal Output2 both make no output, thus in the first stage t1, the fourth scan signal at the fourth scan signal terminal S4 is made at a low voltage level, so that the fourth transistor T4 is turned off in this stage of charging the inductor, which further prevents the first output terminal Output1 from generating a leakage current; likewise, in the third stage t3, the third scan signal at the third scan signal terminal S3 is made at a low voltage level, so that the third transistor T3 is turned off in this stage of charging the inductor, which further prevents the second output terminal Output2 from generating a leakage current.

Yet another embodiment of the present disclosure provides a display device, comprising: an OLED display panel and the power supply circuit described in any of the above embodiments;

wherein the first output terminal Output1 and the second output terminal Output2 of the power supply circuit are connected respectively to pixel driving circuits of the OLED display panel.

Exemplarily, a voltage of the voltage level terminal of the power supply circuit is provided via a single-cell lithium battery, a voltage of the first voltage level terminal is 3V to 4.35V; a voltage ELVDD required by an anode layer of the OLED display panel is 4.6V, a voltage ELVSS required by a cathode layer of the OLED display panel is −5.4V, through the above formulae for calculating the duty ratio it can be derived that, the duty ratio of t1 is 10% to 35%, the duty ratio of t3 is 24% to 64%; thus the above power supply circuit supports a maximum output voltage of 4.6 V and a minimum output voltage of −5.4V when a minimum input voltage of the single-cell lithium battery is 3V, and t1 and t3 do not overlap, i.e., the inductor L is not used concurrently in both the boost stage and buck stage, so the above provided power supply circuit can be applied to OLED display devices.

In addition, the display device may be any products or any components having a display function, such as electronic paper, mobile phones, tablet computers, televisions, displays, notebook computers, digital picture frames, navigator and the like.

The above described merely are specific implementations of the present disclosure, but the protection scope of the present disclosure is not limited thereto, modification and replacements easily conceived by those skilled in the art within the technical range revealed by the present disclosure all fall into the protection scope of the present disclosure. Therefore, the protection scope of the present disclosure is based on the protection scope of the claims.

What is claimed is:

1. A power supply circuit, comprising:
   a first control sub-circuit connected to a first voltage level terminal, a first scan signal terminal, and a first node, and configured to control the first voltage level terminal to be connected to the first node under control of a voltage at the first scan signal terminal;
   a second control sub-circuit connected to a second voltage level terminal, a second scan signal terminal, and a second node, and configured to control the second voltage level terminal to be connected to the second node under control of a voltage at the second scan signal terminal;
   a voltage converting sub-circuit connected to the first node and the second node, and configured to adjust a voltage at the first node and a voltage at the second node under control of the first control sub-circuit and the second control sub-circuit;
   a first output sub-circuit connected to a third scan signal terminal, a first output terminal, and the first node, and configured to output the voltage at the first node to the first output terminal under control of a voltage at the third scan signal terminal; and
   a second output sub-circuit connected to a fourth scan signal terminal, a second output terminal and the second node, and configured to output the voltage at the second node to the second output terminal, under control of voltage at the fourth scan signal terminal.

2. The power supply circuit according to claim 1, wherein the first control sub-circuit comprises a first transistor,
   a first terminal of the first transistor is connected to the first voltage level terminal, a second terminal thereof is connected to the first node, and a gate thereof is connected to the first scan signal terminal.

3. The power supply circuit according to claim 2, wherein the second control sub-circuit comprises a second transistor,
   a first terminal of the second transistor is connected to the second voltage level terminal, a second terminal thereof is connected to the second node, and a gate thereof is connected to the second scan signal terminal.

4. The power supply circuit according to claim 3, wherein the first output sub-circuit comprises
   a third transistor, a first terminal of the third transistor is connected to the first node, and a gate thereof is connected to the third scan signal terminal; and
   a first diode, an anode of the first diode is connected to the first output terminal and a cathode thereof is connected to a second terminal of the third transistor.

5. The power supply circuit according to claim 4, wherein the second output sub-circuit comprises:
   a fourth transistor, a first terminal of the fourth transistor is connected to the second node and a gate thereof is connected to the fourth scan signal terminal; and
   a second diode, a cathode of the second diode is connected to the second output terminal and an anode thereof is connected to a second terminal of the fourth transistor.

6. The power supply circuit according to claim 5, wherein the voltage converting sub-circuit comprises an inductor, a first terminal of the inductor is connected to the first node and a second terminal thereof is connected to the second node.

7. The power supply circuit according to claim 6, wherein each of the transistors is an N-type transistor.

8. The power supply circuit according to claim 6, wherein each of the transistors is a P-type transistor.

9. A driving method for the power supply circuit according to claim 1, comprising:
   in a first stage, the first control sub-circuit connecting the first voltage level terminal to the first node under control of the voltage at the first scan signal terminal, the second control sub-circuit connecting the second voltage level terminal to the second node under control of the voltage of the second scan signal terminal, and the voltage converting sub-circuit storing electrical energy inputted through the first node;
   in a second stage, the first control sub-circuit connecting the first voltage level terminal to the first node under control of the voltage at the first scan signal terminal, the second control sub-circuit disconnecting the second voltage level terminal from the second node under control of the voltage of the second scan signal terminal, the voltage converting sub-circuit adjusting the voltage at the second node through the stored electrical energy, and the second output sub-circuit outputting the voltage at the second node to the second output terminal under control of the voltage of the fourth scan signal terminal;
   in a third stage, the first control sub-circuit connecting the first voltage level terminal to the first node under control of the voltage at the first scan signal terminal, the second control sub-circuit connecting the second voltage level terminal to the second node under control of the voltage of the second scan signal terminal, and the voltage converting sub-circuit storing electrical energy inputted through the first node;

in a fourth stage, the first control sub-circuit disconnecting the first voltage level terminal from the first node under control of the voltage at the first scan signal terminal, the second control sub-circuit connecting the second voltage level terminal to the second node under control of the voltage of the second scan signal terminal, the voltage converting sub-circuit adjusting the voltage at the first node through the stored electrical energy, and the first output sub-circuit outputting the voltage at the first node to the first output terminal under control of the voltage of the third scan signal terminal.

10. The driving method according to claim 9, wherein the first control sub-circuit comprises a first transistor,
a first terminal of the first transistor is connected to the first voltage level terminal, a second terminal thereof is connected to the first node, and a gate thereof is connected to the first scan signal terminal.

11. The driving method according to claim 10, wherein the second control sub-circuit comprises a second transistor,
a first terminal of the second transistor is connected to the second voltage level terminal, a second terminal thereof is connected to the second node, and a gate thereof is connected to the second scan signal terminal.

12. The driving method according to claim 11, wherein the first output sub-circuit comprises:
a third transistor, a first terminal of the third transistor is connected to the first node, and a gate thereof is connected to the third scan signal terminal; and
a first diode, an anode of the first diode is connected to the first output terminal and a cathode thereof is connected to a second terminal of the third transistor.

13. The driving method according to claim 12, wherein the second output sub-circuit comprises:

a fourth transistor, a first terminal of the fourth transistor is connected to the second node and a gate thereof is connected to the fourth scan signal terminal; and
a second diode, a cathode of the second diode is connected to the second output terminal and an anode thereof is connected to a second terminal of the fourth transistor.

14. The driving method according to claim 13, wherein the voltage converting sub-circuit comprises an inductor, a first terminal of the inductor is connected to the first node and a second terminal thereof is connected to the second node.

15. The driving method according to claim 14, wherein each of the transistors is an N-type transistor.

16. The driving method according to claim 14, wherein each of the transistors is a P-type transistor.

17. A display device, comprising an OLED display panel and the power supply circuit according to claim 1;
the first output terminal and the second output terminal of the power supply circuit being connected respectively to pixel driving circuits of the OLED display panel.

18. The display device according to claim 17, wherein the first control sub-circuit comprises a first transistor,
a first terminal of the first transistor is connected to the first voltage level terminal, a second terminal thereof is connected to the first node, and a gate thereof is connected to the first scan signal terminal.

19. The display device according to claim 18, wherein the second control sub-circuit comprises a second transistor,
a first terminal of the second transistor is connected to the second voltage level terminal, a second terminal thereof is connected to the second node, and a gate thereof is connected to the second scan signal terminal.

20. The display device according to claim 19, wherein the voltage converting sub-circuit comprises an inductor, a first terminal of the inductor is connected to the first node and a second terminal thereof is connected to the second node.

* * * * *